UNITED STATES PATENT OFFICE.

MOSES WOOL, OF NEW YORK, N. Y., ASSIGNOR TO SOLOMON L. KUSCHEWSKY, OF SAME PLACE.

PROCESS OF MAKING BRANDY-MASH AND COMPOSITION FOR SAME.

SPECIFICATION forming part of Letters Patent No. 493,460, dated March 14, 1893.

Application filed November 8, 1892. Serial No. 451,398. (No specimens.)

*To all whom it may concern:*

Be it known that I, MOSES WOOL, a subject of the Emperor of Russia, residing at New York, in the county of New York and State of New York, have invented new and useful Improvements in Procesess of Making Brandy-Mash and the Composition for the Same, of which the following is a specification.

The composition of matter which I use in the manufacture of the mash (from which the liquor is distilled) comprises the following ingredients, used in substantially the proportions hereinafter set forth, to wit: dates, malt, raisins, and grapes.

I proceed in the practice of my process as follows: I take raisins of commerce and grind or macerate them in any suitable way, which together with a malt I place in a suitable tub or vessel, together with about twenty-seven pounds of water, and raise the temperature thereof to about 52° Reaumur. The amount of raisins and malt used for one hundred pounds of mash are four and one-half (4½) pounds of raisins and the same quantity of malt. This is permitted to stand for about twenty-four hours and cool at pleasure, after which ice is added for the purpose of lowering the temperature more rapidly, which should be continued until the mass reaches a temperature of about thirteen (13°) or fourteen (14°) degrees Reaumur; or the mass can be reduced in temperature at this stage by other artificial means.

The next step in the process (although I do not limit myself to the order stated therein) consists in grinding or macerating grapes, say two and three-quarter (2¾) pounds to one hundred pounds of mash, and place them in a tub or other suitable vessel; and at the same time one-quarter (¼) pound of carbonate of ammonia in a liquid condition is added thereto, which is used to accelerate the fermentation of the mass. When the macerated grapes and carbonate of ammonia are thoroughly commingled, I place them in a cooling device or tub in which the mass is allowed to ferment; and in this condition the mass is permitted to stand about ten or twelve hours until the fermentation is complete or has reached the point desired.

The malt, raisins and grapes, with the added carbonate of ammonia, prepared substantially as above set forth, constitute what I term the yeast, or in other words the active fermenting agent.

The next step in the process is to obtain the saccharine derivative which is to yield the alcohol by the aid of the yeast or active ferment before described.

The saccharine fluid is derived, in my invention, from ordinary dates of commerce, of which I use, for one hundred pounds of mash, about eighty-eight (88) pounds. The dates are placed in a vessel, such as a steam jacketed cooking tub, and closed except for the egress of vapor, and about forty-five (45) gallons of water is added. The temperature of the mass is brought up to about 55° or 56° Reaumur, or until it gets to a thick and pasty consistency, and while cooking it is stirred, preferably by a mechanical mixer. When this result is secured the mass is allowed to cool, which may be done by means of a pipe coil passing through or about the kettle through which water is passed, and this cooling is continued for about two hours. The dates are then passed through a cleaning machine, which removes the pits and other refuse matter, leaving the body thereof free for use.

The next operation is to run the dates, thus prepared, and the yeast, into a receptacle where they are to ferment for the purpose of fermenting the saccharine fluid. For this purpose I cause the yeast and dates to enter the fermenting tub through one pipe or conductor, so that when they reach the fermenting tub they are thoroughly commingled. When the fermentation has proceeded to the desired point, the mash is complete, and the process of distillation can be proceeded with in any of the ways known to the art.

The amount of ingredients, before set forth, will produce about six gallons of proof brandy.

Having described my invention, I claim—

1. The process of making a brandy mash which consists in preparing a suitable fermenting base, and separately preparing a vinous ferment and supplying the latter with an active fermenting agent, commingling the fermenting base and vinous ferment together to form a yeast, and then mixing the yeast and a saccharine derivative together, and fermenting the resulting mass, substantially as described.

2. A composition of matter for forming a brandy mash, comprising malt and raisins and water as a fermenting base, a vinous ferment, carbonate of ammonia as a fermenting agent, all of which form a yeast or active ferment, and a saccharine fluid derived from dates, combined in substantially the manner and proportions set forth, substantially as described.

3. A composition of matter for forming a brandy mash, comprising a fermenting base, a fermenting agent, a vinous ferment, and a saccharine fluid derived from dates, combined in or about the manner set forth, substantially as described.

Signed in the city, county, and State of New York this 7th day of November, 1892.

MOSES WOOL.

Witnesses:
 JOSEPH L. LEVY,
 S. L. KUSCHEWSKY.